Figures 1, 7:
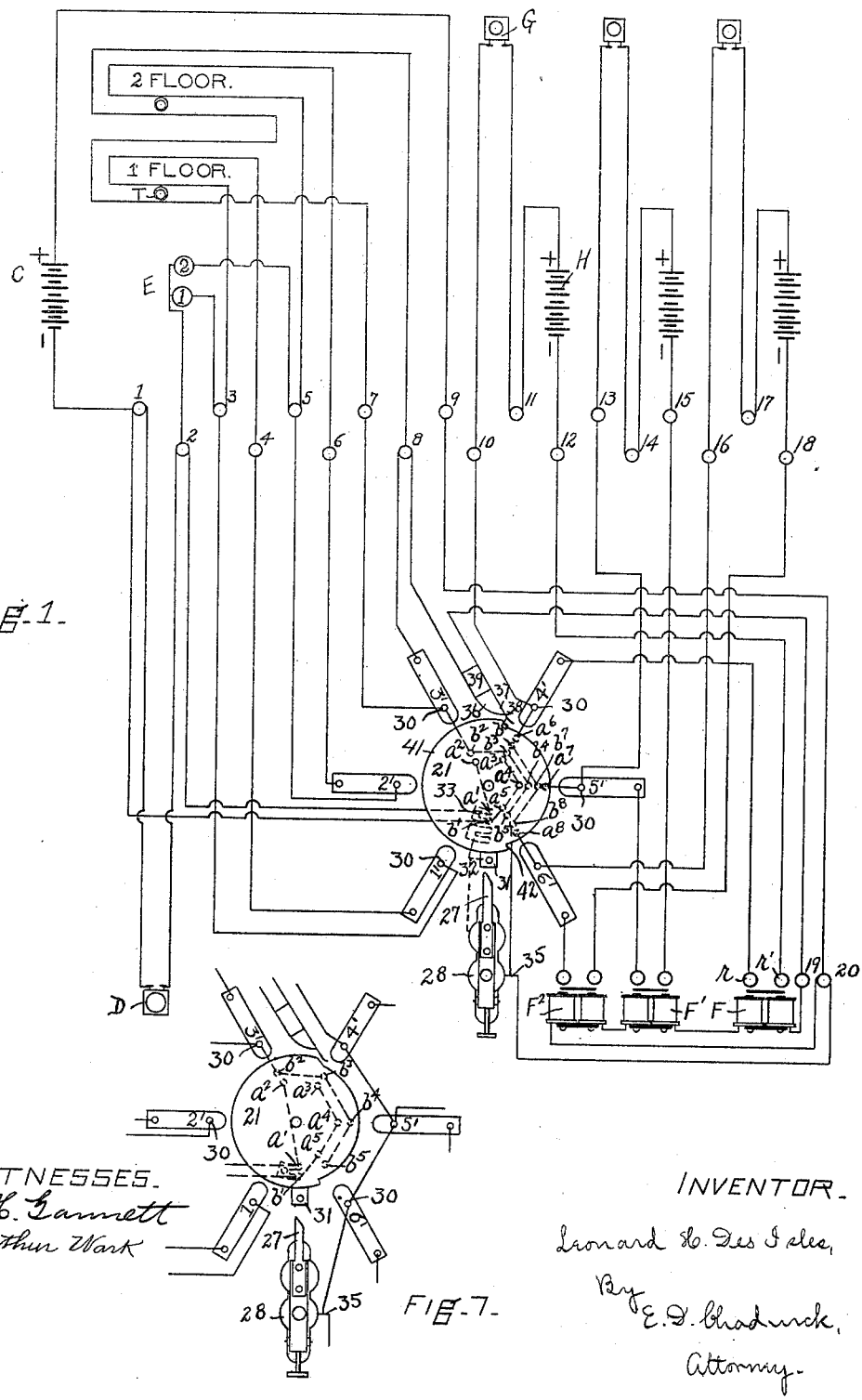

No. 659,793. Patented Oct. 16, 1900.
L. H. DES ISLES.
ELECTRIC ALARM SYSTEM AND TESTING APPARATUS.
(Application filed Jan. 10, 1900.)
(No Model.) 3 Sheets—Sheet 1.

WITNESSES.
C. H. Garnett
Arthur Wark

INVENTOR.
Leonard H. Des Isles,
By E. D. Chadwick,
Attorney.

No. 659,793. Patented Oct. 16, 1900.
L. H. DES ISLES.
ELECTRIC ALARM SYSTEM AND TESTING APPARATUS.
(Application filed Jan. 10, 1900.)
(No Model.) 3 Sheets—Sheet 2.

WITNESSES_
C. H. Gannett
Arthur Wark

INVENTOR_
Leonard H. Des Isles,
By E. D. Chadwick,
Attorney_

No. 659,793. Patented Oct. 16, 1900.
L. H. DES ISLES.
ELECTRIC ALARM SYSTEM AND TESTING APPARATUS.
(Application filed Jan. 10, 1900.)
(No Model.) 3 Sheets—Sheet 3.

WITNESSES.
C. H. Garnett.
Arthur Wark

INVENTOR.
Leonard H. Des Isles,
By E. D. Chadwick,
Attorney.

UNITED STATES PATENT OFFICE.

LEONARD H. DES ISLES, OF CAMBRIDGE, MASSACHUSETTS, ASSIGNOR TO ROSCOE F. HERSEY, OF ST. PAUL, MINNESOTA.

ELECTRIC ALARM SYSTEM AND TESTING APPARATUS.

SPECIFICATION forming part of Letters Patent No. 659,793, dated October 16, 1900.

Application filed January 10, 1900. Serial No. 1,017. (No model.)

*To all whom it may concern:*

Be it known that I, LEONARD H. DES ISLES, a citizen of the United States, residing at Cambridge, in the county of Middlesex and State of Massachusetts, have invented certain new and useful Improvements in Electric Alarm Systems and Testing Apparatus, of which the following is a specification.

My invention relates to electric alarm systems such as are used for the purpose of protecting buildings from fire by giving timely warning thereof, and to apparatus for testing the condition and efficiency of such systems, and is intended to improve upon prior inventions of this character in certain particulars, which will hereinafter appear.

According to a common arrangement of such systems each floor of the building protected is so wired as to provide a normally-open circuit comprising two parallel branches bridged at suitable intervals by thermostats or the like and connected, respectively, to the terminals of a battery, the circuit including appropriate alarm-giving means—such as, for example, one or more relay-magnets each arranged to close when energized a local circuit through an alarm-bell. The two parallel branches above referred to are commonly known as the "red" and "blue" wires, respectively, as it is customary to use therefor insulated wires of those or other distinct colors. It is also customary to provide a separate blue wire for each floor, but to carry a single red wire through all the floors, each of said wires forming a complete loop in order that a break in either or both of the parallel branches may not prevent the giving of an alarm, as will be more fully explained hereinafter. I have herein shown and described my present improvements as applied to a system such as is above referred to, comprising two internal circuits, corresponding to the two floors of a building, and three external or relay circuits, each adapted to give an alarm; but it will be understood that my invention is not limited to any particular number of such circuits, nor to systems in which one of the branch circuits is common to all the floors.

My invention in its preferred form is illustrated in the accompanying drawings, in which—

Figure 2:
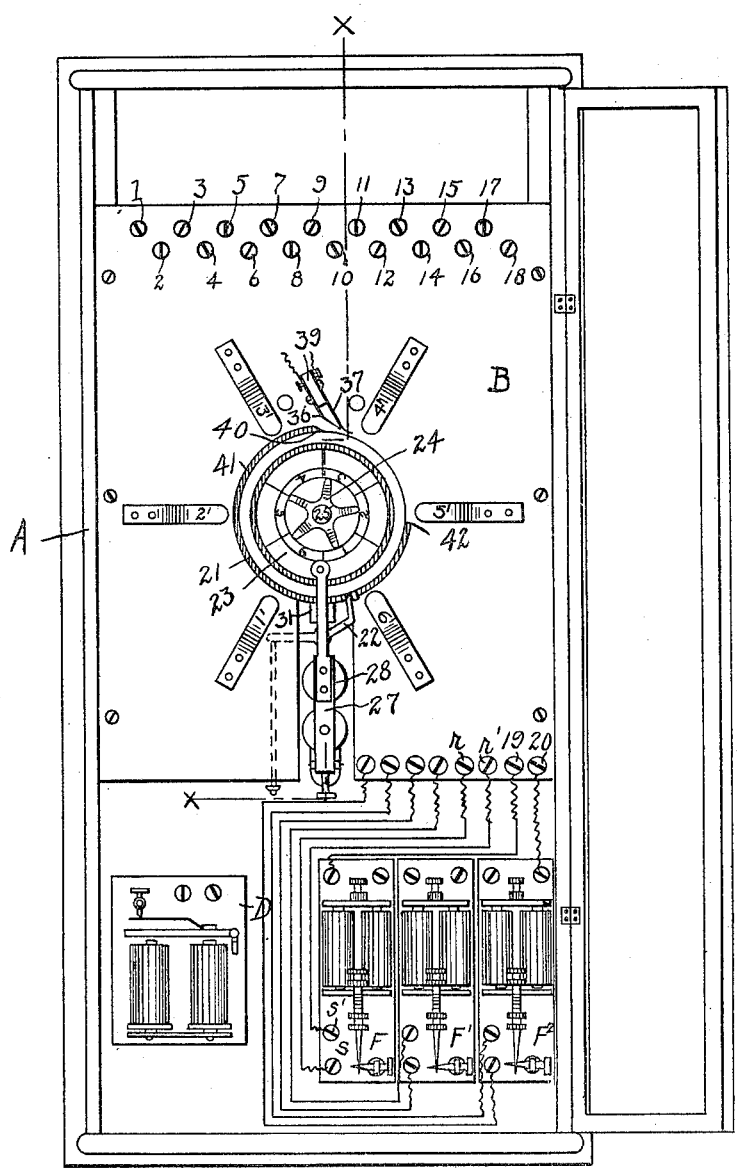
Figure 3:
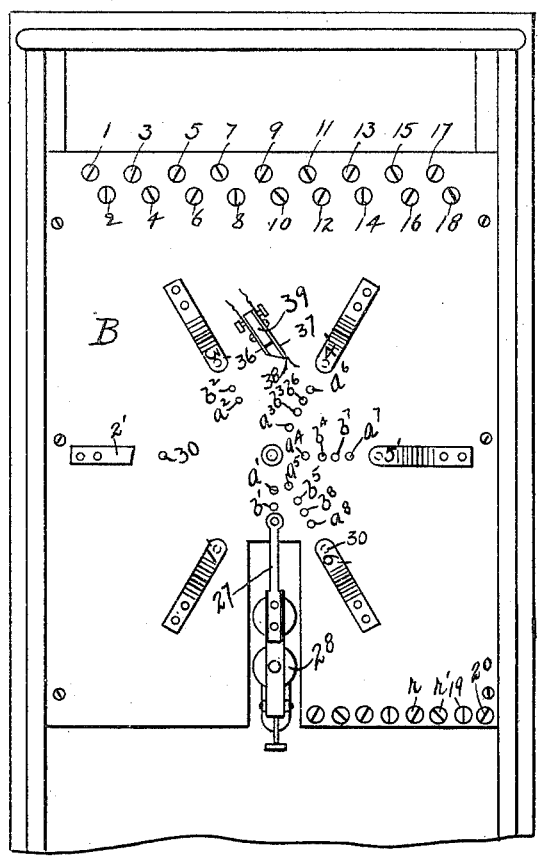
Figure 4:
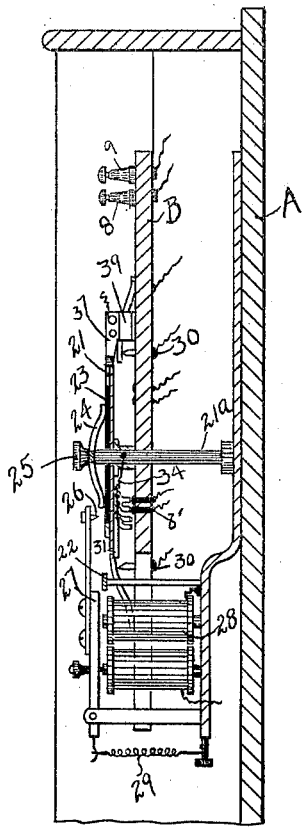
Figure 5:
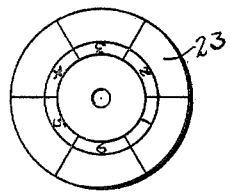
Figure 6:
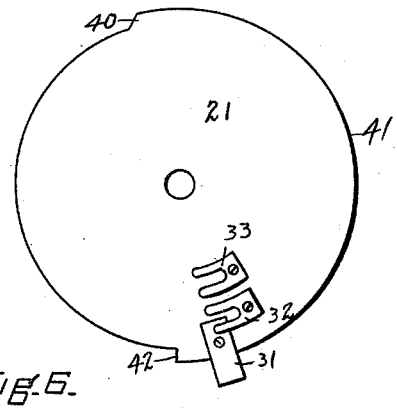

Figure 1 is a diagrammatic view showing the system of wiring and the various contacts found in the testing-case. Fig. 2 is a face view in elevation of a testing-case. Fig. 3 is a similar view of the upper portion of the testing-case with certain movable parts removed therefrom. Fig. 4 is a section through the upper portion of said case, taken on the line $x\ x$ in Fig. 2. Fig. 5 is a face view of a disk, hereinafter described, on which the record of a test is made. Fig. 6 is a view of the inner face of a rotating disk. Fig. 7 is a diagrammatic view showing a slight modification.

In the drawings, A represents a case within which my testing apparatus may be contained, and the numbers 1 to 20, inclusive, indicate binding-posts, which are commonly located in the case A and serve as convenient terminals for the various circuits and connections. Said binding-posts are preferably set into a plate B of insulating material, such as hard rubber, contained in case A, and in front of said plate B is located a disk or dial 21, made, preferably, of hard rubber and mounted on an axis $21^a$, which passes through the plate B and is connected behind the same to a clockwork mechanism (not shown) of any desired construction, such that when it is released, as by tripping a latch 22, it will cause said disk 21 to rotate once and then stop until again released. The front or outer face of the disk 21 is adapted to carry a record-disk 23, which is usually made of paper and is held flat against the disk 21 by means such as a spider 24. Said spider is removably clamped to the axis of the disk 21 by means of a nut 25, so that the disk 23 may conveniently be replaced by a fresh one for each test. The record indicating the result of a test is made on one of these blanks 23 by means of a point 26, carried by the armature 27 of a magnet 28 and so arranged that so long as said magnet is energized by the passage of an electric current through it the point 26 will be held in contact with the disk 23, but will be withdrawn therefrom by means of a spring 29 upon the interrupting of said current.

The parts just described are not, broadly speaking, original with me, but have hitherto been used in testing devices having the same general function as mine, and I have adopted them because they may conveniently be used in connection with the novel features in which my present invention resides.

A main feature of my invention is the provision of means whereby each branch of each of the internal or floor circuits is automatically tested independently of either of the other branches, thus enabling a break to be located much more accurately than is possible when two or more of said branches or circuits are thrown into series with each other while being tested, as is done in all prior testing devices of this character, so far as I am aware. Another feature of my invention provides for the testing of both the internal circuits and the external or relay circuits through a single recording-magnet, thereby obtaining certain advantages, which, together with certain minor features of improvement, will hereinafter be set forth.

The branches of the normally-open floor-circuits are hereinafter called in most instances simply "circuits" or "internal," "floor," or "loop" circuits.

In order to test the several circuits separately, as aforesaid, I provide distinct connections for each of said circuits in the testing-case, and also provide means whereby during a test said connections are successively thrown into circuit with a test-indicating device. To this end my preferred construction is as follows:

Around the disk 21 is located a series of metallic springs 1', 2', 3', 4', 5', and 6', each secured at one end to the plate B, said springs being equal in number to the circuits to be separately tested. A metallic pin 30 is fixed in the plate B directly beneath the inner or free end of each of said springs, each of said pins being normally in contact with its respective spring. Each pin 30 is connected to one of the binding-posts above referred to, as is also the fixed end of each of said springs, as indicated in Figs. 1 and 4. A projecting metallic contact-piece 31 is attached to the disk 21 and is carried around with it as it rotates, passing under the free end of each of said springs in succession and acting to lift the same, and thereby break its contact with the corresponding pin 30 beneath it and at the same time to establish a contact between the contact-piece and spring. Beneath the disk 21 are located a number of contact-pins $a'\ b'$, $a^2\ b^2$, $a^3\ b^3$, $a^4\ b^4$, $a^5\ b^5$, $a^6\ b^6$, $a^7\ b^7$, and $a^8\ b^8$, fixed in the plate B and arranged in pairs, as shown, and coöperating therewith are two double spring-contacts or wipers 32 and 33, which are secured to the bottom of the disk 21 and are thereby insulated from each other. These wipers are so located that as they are carried over the successive pairs of pins $a^2\ b^2$, &c., by the rotation of the disk 21 they will short-circuit each pair of said pins simultaneously with the engagement of the corresponding spring 3', &c., by the contact-piece 31.

The parts above described are wired as follows: From the main battery C runs a wire to binding-post 1, which is also connected by distinct wires to the contact-pins $a'$ and $b'$, the latter connection being direct and the former passing through a vibrator or "buzzer" D and post 2. From post 2 a wire leads to an annunciator E of the usual construction, each drop of which is connected in series with one of the floor loops or blue wires. Thus for the first floor the blue wire runs from drop 1 to post 3, thence around the floor to post 4, thence to the spring 1' and through it to the corresponding pin 30 beneath it, and thence back to post 3, thus completing the loop. Similarly from drop 2 the blue wire runs to post 5, thence around the second floor to post 6, thence through the spring 2' and corresponding pin 30 back to post 5. Any desired number of floors are similarly wired, and for each of them a similar spring is provided in the testing-case. The red wire, which is common to all the floors, runs from post 7 around the floors to post 8, thence to spring 3', and through it and its pin 30 back to post 7. Post 8 is also connected to post 19, preferably through a circuit-breaker hereinafter described, and from post 19 the circuit runs through the coils of the relay-magnets F, F', and $F^2$ to post 20, to which also are connected two wires, one running back to the battery C through post 9 and the other to the coils of the recording-magnet 28. The other terminal of said coils is electrically connected to the contact-piece 31, preferably through the clockwork mechanism to which the magnet 28 is secured and of which the axis $21^a$ forms a part, said axis being connected to the contact-piece 31 by a wire 34. To posts 10, 11, and 12 a relay-circuit is connected which includes a vibrating bell G and a battery H and is normally open at the relay-magnet F. The post 10 is connected through the spring 4' and its pin 30 to a binding-post $r$, and the post 12 is directly connected to a post $r'$. The relay-magnet F, to which the others are similar, may be of any usual construction and need not be described further than by stating that it is adapted when energized to establish electric communication between two terminals $s$ and $s'$, to which the posts $r$ and $r'$ are respectively connected. In a similar manner the other relay or external circuits, each including a similar bell and battery, are connected, respectively, to the posts 13, 14, and 15 and 16, 17, and 18, the respective circuits including the springs 5' and 6' and their pins 30 and being normally open at the relay-magnets F' and $F^2$. The fixed contact-pins beneath the disk 21 are electrically connected in groups by means of wires secured to their inner ends or otherwise, the pins $a'$ $a^2$ forming one group, the pins $a^3$ $a^4$ $a^5$ $b'$ another group, the pins $b^2$ $b^3$ $b^4$ $b^5$ a third group, which is also connected to the pin 30 beneath the spring 3', and the pins $b^6$ $b^7$ $b^8$ a fourth group, from which a wire runs to the coils of the recording-magnet 28, where it joins the wire from post 20, as at 35. The pins $a^6$ $a^7$ $a^8$ are respectively connected to the pin 30 beneath the springs 4', 5', and 6'.

For the purpose of cutting out the relay-magnets while testing the red wire I prefer to employ a circuit-breaker which may consist of two metallic strips 36 and 37, normally in contact with each other at 38 and secured to a fixed insulating-block 39, said strips being connected to their respective circuit-wires leading to posts 8 and 19. The contact at 38 is adapted to be broken through the instrumentality of the disk 21 at any point in its rotation prior to the testing of the red wire. To this end said disk 21 may be provided with a cam-face 40, adapted to engage the free end of the strip 37 and spring it away from the strip 36, in which separated position it will be retained by the extended edge 41 of the disk 21 until the end 42 of said extended edge has passed the point of contact, which is arranged to occur prior to the testing of the relay-circuits.

The system and apparatus above described operates as follows: Under normal conditions the parts are in the position illustrated in Fig. 1, wherein the double spring-contact 33 short-circuits the contact-pins $a'$ $b'$, and thereby provides a path between posts 1 and 2 of much less resistance than the parallel path through the buzzer D. If now an electric connection is established between the red and blue wires on either floor of the building by means of the fusion of a thermostat or otherwise, a circuit through the main battery C will thereby be completed. In the case of a connection established on the first floor this circuit would run from battery C through post 1, contact-pin $b'$, double spring-contact 33, pin $a'$, post 2, drop 1 of the annunciator, post 3, thence through the fused thermostat T on the first floor to the red wire, thence to post 8 through the path of least resistance, thence through the circuit-breaker to post 19, thence through the coils of the relay-magnets F, F', and F² to post 20, and back to the battery through post 9. The current thus caused to flow will actuate all the relay-magnets, and thereby complete the relay-circuits through the respective alarm-bells, the circuit through bell G, for example, being established from battery H through post 11, bell G, post 10, spring 4', post $r$, thence through the contact made by the operation of the relay-magnet F to post $r'$, and thence through post 12 to the other terminal of said battery. The circuits through the other alarm-bells are similarly completed, and thereby each bell is caused to give an alarm at the place where it is located. It will be seen that a break either in the blue wire or in the red wire, or in both, will not interfere with the giving of an alarm, because each branch of the circuit on each floor forms a complete loop, so that the current if interrupted and prevented from flowing in one direction will nevertheless find a path in the opposite direction. It will also be noted that the buzzer D is not operated in giving an alarm, thereby securing a continuous current through the relay-magnets and preventing them from vibrating and thus interfering with the proper operation of the alarm-bells G.

To test the system, the clockwork mechanism is started by raising the latch 22, whereupon the disk 21 is caused to perform one complete rotation and then to stop. The first effect of the rotation of said disk is the breaking of the short circuit through the contact-pins $a'$ $b'$, so that the testing-current for the floor-circuits must pass through the buzzer D, which by rapidly making and breaking the circuit causes the armature of the recording-magnet to vibrate, so that the record traced by its point 26 will consist of a series of points as distinguished from a continuous straight line, which would tend to tear and displace the record-disk 23. Upon the further rotation of the disk 21 the contact-piece 31 passes under the free end of the spring 1', breaks the contact made by it with its pin 30, and establishes a circuit through the blue wire on the first floor and the recording-magnet 28, which circuit remains complete as long as said contact-piece remains in contact with said spring, the current running from the main battery C through post 1, buzzer D, drop 1 of the annunciator, post 3, around the blue wire on the first floor, through post 4, spring 1', contact-piece 31, axis 21ª, clockwork mechanism, recording-magnet 28, post 20, post 9, and thence back to the battery. If the armature of the magnet 28 vibrates, it shows that this circuit is complete, and permanent evidence of the test is afforded by the dotted record formed on the record-disk 23, which may be removed, dated, and preserved. If said armature fails to vibrate, it shows that there is a break in the circuit, which break, assuming the testing-case and its contained parts and connections to be in good working order, is located as being in the blue wire on the first floor. As the disk 21 continues to rotate the contact-piece 31 passes in succession under the springs through which the respective floor-loops are normally completed, thus testing the blue wire on each floor in succession in the manner above described. Before the disk 21 has rotated sufficiently to bring the contact-piece 31 into engagement with the spring 3', which normally completes the red-wire loop, the contact at 38 is broken by means of the cam-face 40, hereinbefore described, thereby opening the circuit through the relay-magnets, and when the contact-piece 31 reaches said spring 3' the double spring-contact 33 simultaneously short-circuits the pins $a^2$ $b^2$. The red-wire loop running through all the floors is thereupon tested, the circuit being established from battery C through post 1, buzzer D, post 2, pin $a'$, pin $a^2$, double spring-contact 33, pin $b^2$, pin 30, under spring $3'$, post 7, around the red-wire loop, post 8, spring $3'$, contact-piece 31, and thence through the recording-magnet and post 20 back to the battery. Upon the continued rotation of the disk 21 and before the contact-piece 31 reaches the spring $4'$ the point 42 passes the strip 37 and thus permits the reëstablishment of the contact at the point 38, and as said contact-piece 31 reaches and engages said spring $4'$ the double spring-contacts 32 and 33 respectively short-circuit the pins $a^6 b^6$ and $a^3 b^3$. The relay-circuit through the bell G is thereupon tested, as follows: The main circuit through the relay-magnets is established from battery C through post 1, pins $b'$ $a^5$ $a^4$ $a^3$, double contact 33, pins $b^3$ and $b^2$, pin 30, and spring $3'$, post 8, contact 38, post 19, and thence through the coils of the relay-magnets to post 20 and back to the battery. The relay-magnets being thus actuated all the relay-circuits are thereby closed and cause their respective bells to ring, while a test is made of the circuit through bell G, the test-circuit being established from the local battery H through post 11, bell G, post 10, pin 30, under spring $4'$, pin $a^6$, double spring-contact 32, pins $b^6$ $b^7$ $b^8$, recording-magnet 28, axis $21^a$, contact-piece 31, spring $4'$, posts $r$ and $r'$, electrically connected by the action of the relay-magnet F, post 12, and thence back to the battery H. The bell G is a vibrating bell as distinguished from a single-stroke bell, and hence its operation causes a corresponding vibration of the armature of the magnet 28, so that the making of a proper record on the disk 23 shows that the relay-circuit is unbroken and that the bell G actually rings. It will be seen that no vibration of the armature of the magnet 28 can be caused by the buzzer D, because said buzzer is no longer in circuit. The remaining relay-circuits are successively tested in a similar manner, and the rotating disk 21 finally returns to its initial position and stops, simultaneously short-circuiting the pins $a' b'$, as in the normal condition of the apparatus.

I have shown in Fig. 7 a slight modification, wherein the contact-pins $a^6 b^6$, $a^7 b^7$, $a^8 b^8$, and the double spring-contact piece 32 are all omitted, the pins 30 beneath the respective springs $4'$, $5'$, and $6'$ being connected to each other and to the coils of the recording-magnet at 35. This arrangement operates and is tested in substantially the same manner as the one above described and differs therefrom merely in that it establishes a permanent electric connection between one pole of the main battery C and one pole of each of the local or relay batteries.

It will thus be seen that in a system constructed and arranged in accordance with my invention each branch of each of the floor-circuits is provided with testing connections independently of either of the other branches, so that said branches may be tested separately, as aforesaid, thereby not only locating a break more accurately, but also obviating the necessity of testing through an excessive length of wire, as is the case when two or more of said branches or circuits are tested in series. Furthermore, my invention provides for testing the relay-circuits through a single recording-magnet, thereby simplifying the testing apparatus, and also gives a test at the same time of the connections between both poles of the main battery and the respective floor-loops and of the circuit-breaker and the contact at the point 38.

The wires connecting posts 3 and 5 with the pins 30 under the springs $1'$ and $2'$, respectively, serve merely to complete the respective floor-loops and may be omitted without affecting the operation of the apparatus otherwise than by destroying the advantage gained by using the complete loops. Also when the relay-circuits are not employed or are of the kind which are normally closed instead of normally open the buzzer D may be omitted by substituting for the point 26 a star-wheel rotatable on the end of the armature 27, as has heretofore been done, or by making the magnet 28 a vibratory magnet. Many other possible modifications will be sufficiently obvious without further description.

I claim as my invention—

1. In an apparatus of the character described, the combination with one or more circuits each comprising two parallel branch circuits, of a test-indicating device, connections distinct from said circuits between said test-indicating device and one terminal of a battery, and means for electrically connecting said device with the other terminal of said battery through each of said branch circuits separately.

2. In an apparatus of the character described, the combination of one or more circuits each comprising two parallel branch circuits, a separate testing-terminal for each of said branch circuits, a test-indicating device connected to one terminal of a battery independently of said circuits, connections between the other terminal of said battery and said branch circuits respectively, a movable contact-piece in circuit with said test-indicating device, and means for making contact between the contact-piece and said testing-terminals successively.

3. In an apparatus of the character described, the combination with a circuit comprising two parallel branches normally connected respectively to the terminals of a battery, of a test-indicating device independently connected to one terminal of said battery, means for interrupting the connections between the latter terminal and that branch circuit to which it is normally connected, and for establishing a connection between said branch circuit and the other battery-terminal, while said branch circuit is being tested, and means for connecting the test-indicating device with each of said branch circuits, independently of the other.

4. In an apparatus of the character described, the combination of two contact-pins $a^2 b^2$, connections between one of said pins and one terminal of a battery, a floor-circuit connected to the other pin, and also connected through a circuit-breaker to the other terminal of the battery, a recording-magnet independently connected to the latter battery-terminal, means for electrically connecting said circuit and recording-magnet, and means for short-circuiting said pins and for operating the circuit-breaker while said circuit is being tested.

5. In an apparatus of the character described, the combination of a test-indicating device adapted to be operated by a vibratory current, a vibrator or buzzer, and means for throwing said buzzer into circuit with said test-indicating device prior to the operation of the latter.

6. In an apparatus of the character described, the combination of an internal or floor circuit, a vibrator or buzzer, connections leading from said circuit through said buzzer to one terminal of a battery, a normally-closed short-circuiting connection between said circuit and battery-terminal, a test-indicating device electrically connected to the other terminal of said battery, and means for opening said short-circuiting connection and subsequently establishing a circuit from said internal circuit to said test-indicating device.

7. In an apparatus of the character described, the combination of a series of circuits comprising one or more floor-circuits and one or more relay-circuits, connections between said circuits respectively and one terminal of their respective batteries, a test-indicating device connected to the other terminals of said batteries, and means for electrically connecting said device with said circuits separately.

8. In an apparatus of the character described, the combination of a series of normally-open internal and external circuits severally connected to their respective batteries, a vibratory bell included in each of the external circuits, a test-indicating device adapted to be operated by a vibratory or intermittent current, means for establishing a testing-circuit through said device and said internal and external circuits successively, a vibrator or buzzer, and means for throwing the latter into the testing-circuits through said internal circuits and for throwing said vibrator out of circuit while the external circuits are being tested.

9. In an apparatus of the character described, the combination of an internal or floor circuit, a circuit-breaker, one or more relay-magnets, connections leading from said floor-circuit through said circuit-breaker and relay-magnets to one terminal of a battery, a test-indicating device one terminal of which is in circuit with said connections between said relay-magnets and battery-terminal, and means for operating said circuit-breaker and subsequently establishing a testing-circuit through said test-indicating device and floor-circuit to the other terminal of said battery.

10. In an apparatus of the character described, the combination of a rotating disk adapted to carry a record-blank, a series of springs surrounding the same and each connected to a circuit to be tested, a recording-magnet, a contact-piece carried by said disk, electric connections from said contact-piece through the recording-magnet to one terminal of a battery, and connections between the other terminal of said battery and said circuit to be tested.

11. In an apparatus of the character described, the combination of a rotating disk adapted to carry a record-blank, a series of springs surrounding the same, a pin under the free end of each spring and normally in contact therewith, a loop-circuit normally completed through each of said springs and its corresponding pin, a recording-magnet, a contact-piece carried by said disk and in circuit with said magnet, and battery connections for said magnet and loop-circuit.

12. In an apparatus of the character described, the combination of a rotating disk adapted to carry a record-blank, a series of springs surrounding the same, internal or floor circuits respectively connected to some of said springs, external or relay circuits connected respectively to the remainder of said springs, a contact-piece carried by said disk, main battery connections for the internal circuits, relay-magnets included in said connections, equal in number to the external circuits and adapted to close the same when energized, a recording-magnet the coils of which are connected at one end with said contact-piece and at the other end with both the internal-circuit battery and the external circuits, and means for closing the circuit through said relay-magnets while said contact-piece is in contact with the respective springs to which the external circuits are connected.

13. The combination of two fixed contact-pins $a' b'$, a disk 21 carrying a double contact 33 normally short-circuiting said pins, a series of springs each connected to a floor-circuit, a magnet 28, a contact-piece 31 carried by said disk and connected to the coils of said magnet, a battery, connections leading from the terminals thereof to said floor-circuits and magnet-coils respectively, a vibrator or buzzer connected in parallel with a circuit leading through said pins $a' b'$, said parallel circuits being included between said battery and said floor-circuits, and means for rotating said disk.

14. The combination of a battery, a vibrator or buzzer, two contact-pins $a' a^2$ connected to each other and to one terminal of said battery through said buzzer, a floor-circuit connected to a spring $3'$ and to a contact-pin $b^2$, a circuit-breaker and connections through the same from said floor-circuit to the other terminal of said battery, a magnet 28 connected to said latter terminal, a disk 21 provided with a contact-piece 31 connected to said magnet and with a double-contact piece 33, a cam-face on said disk adapted to operate said circuit-breaker prior to the testing of said floor-circuit, and means for rotating said disk.

15. The combination of a disk 21 carrying a contact-piece 31 and two double spring-contacts 32 and 33, a series of contact-pins $a^3$ $b^3$ $a^4$ $b^4$ $a^5$ $b^5$ $a^6$ $b^6$ $a^7$ $b^7$ $a^8$ $b^8$ arranged in pairs as shown, connections between the pins $b^2$ $b^3$ $b^4$ $b^5$ and one terminal of a battery, three relay-magnets included in said connections, a relay-circuit adapted to be closed by each of said magnets and including a spring, a pin 30 beneath each spring and connected respectively to the pins $a^6$ $a^7$ $a^8$, a vibrating bell in each of said relay-circuits, a vibratory magnet and connections leading through the same from the contact-piece 31 to the pins $b^6$ $b^7$ $b^8$, connections between pins $a^3$ $a^4$ $a^5$ and the other terminal of said battery, a record-blank adapted to be carried by said disk, and means for rotating the latter.

In testimony whereof I have hereunto subscribed my name this 5th day of January, 1900.

LEONARD H. DES ISLES.

Witnesses:
ARTHUR WORK,
E. D. CHADWICK.